Patented July 26, 1932

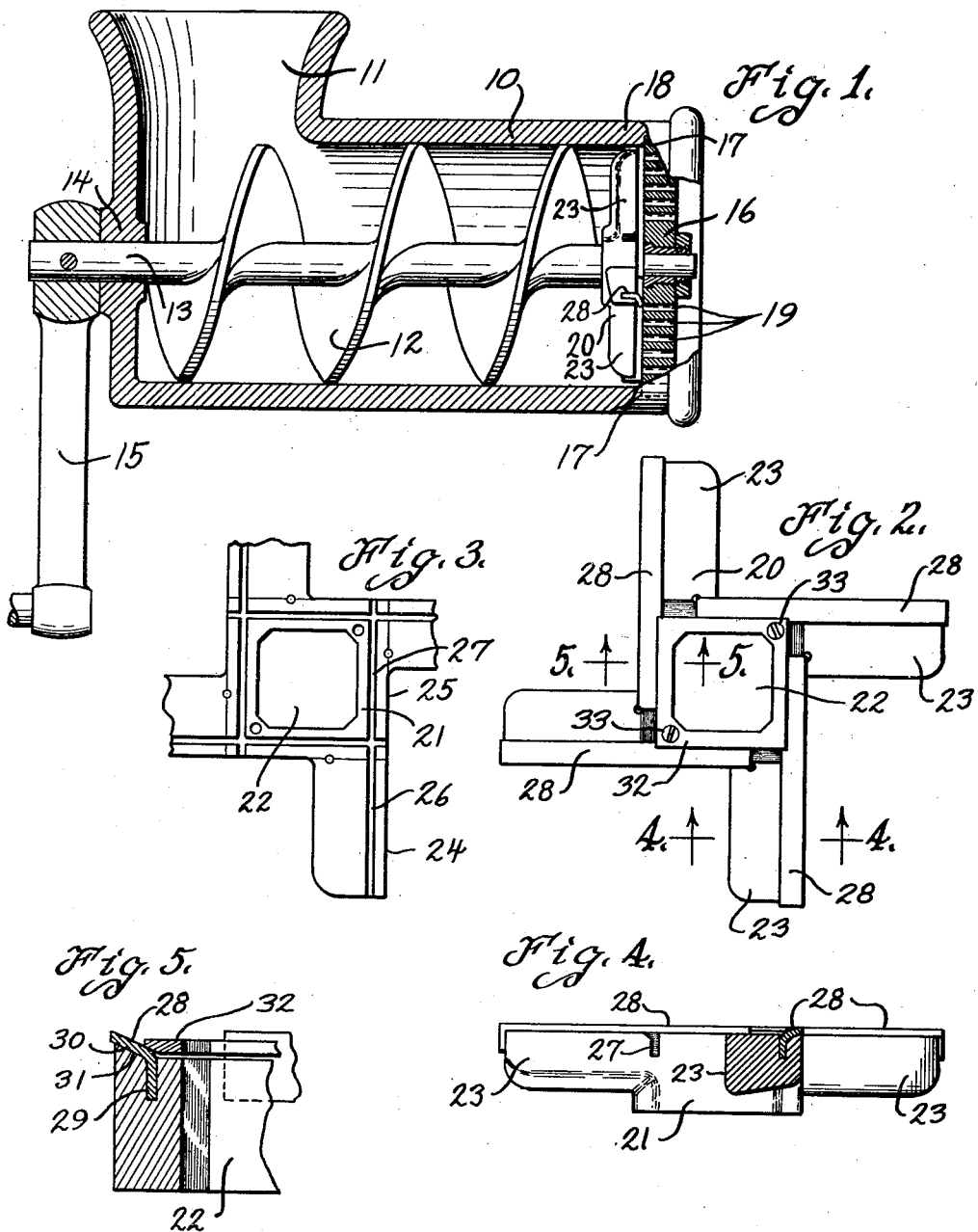

1,869,220

UNITED STATES PATENT OFFICE

JOHN A. KLOD, OF CHICAGO, ILLINOIS

MEAT CUTTER

Application filed May 3, 1930. Serial No. 449,592.

This invention relates to certain novel improvements in meat cutters and has for its principal object the provision of an improved construction of this character which will be highly efficient in use and economical in manufacture.

In meat cutters or grinders with which I am familiar prior to my invention, the conventional construction includes a rotatable feeder which feeds the meat to a perforated plate for passage therethrough subsequent to the cutting of the meat. This cutting of the meat is brought about by a rotatable cutter including blade members movable over the inner face of the plate. This cutter and the blades thereof are rotatable with the feeder and designed to rotate in circular fashion. In the mounting of the blades they are arranged at right angles with respect to each other for this circular movement. In making the circular movement it is manifest that the meat is forced through the openings of the plate rather than first being cut or ground. This results because of the fact that the blades do not move so as to create a shearing cutting action on the meat and consequently the meat is packed against the plate to be forced through the openings thereof. By reason of this jamming the meat gets packed tight in the perforations, especially near the center part of the plate. This packing of the meat causes the meat to become hardened and consequently a friction is created which heats the meat. The meat packing and being heated by friction results in the burning of all the albumin therefrom and consequently the meat emerges at some time during the cutting operation in a spoiled state or condition. I have found that if these blades take a movement over the face of the plate which would result in a shearing action that the meat will be effectively cut prior to passage through the perforations in the plate and the collection of spoiled meat will be eliminated to a maximum degree. It is, therefore, one of the many objects of this invention to eliminate these difficulties and to overcome these disadvantages and to provide a cutter structure which will move over the plate to effectuate shearing cutting action upon the meat prior to its passage through the openings in the plate.

I have also found that where meat is permitted to collect adjacent the hub of the blade, by reason that such meat is not forced through the openings, the collected meat becomes hardened and consequently tends to create a friction and ultimately ruins or deteriorates the cutting value of the blades at this point. It is, therefore, one of the many objects of this invention to overcome this difficulty.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a longitudinal vertical sectional detail view of a meat cutter or grinder embodied in the invention;

Fig. 2 is a plan view of the cutter structure;

Fig. 3 is a fragmentary plan view similar to the illustration in Fig. 2 showing the blades thereof removed;

Fig. 4 is a sectional detail view of the cutter structure taken substantially on the line 4—4 on Fig. 2; and Fig. 5 is a fragmentary sectional detail view of the cutter structure taken substantially on the line 5—5 of Fig. 2.

Referring to the drawing, the conventional meat grinder usually comprises a casing 10 through which the meat to be ground is fed. The meat is introduced to this casing 10 through a funnel shaped mouth 11. Mounted in the casing 10 is a feeder 12 supported by a shaft 13 having one end portion journaled in a suitable bearing 14 and carrying a handle 15 whereby manipulation of the feeder is brought about. The opposite end portion of the feeder is journaled in a plate 16, which plate is mounted against a shoulder 17 provided by the discharge end 18 of the casing 10. This plate 16 is provided with a plurality of perforations 19 through which the meat after being cut is adapted to pass. The plate 16 may be mounted in any approved manner upon the casing as will best serve the purpose.

Mounted for rotation with the feeder 12 is a holder 20 including a hub portion 21 having a substantially square opening 22 formed therein for mounting upon a square shaped portion of the shaft 13. This holder is mounted on the shaft 13 at the inner side of the plate 16. Extending from this hub portion are arms 23. These arms are arranged in alternate order upon the hub 21. That is, the arms on opposite corresponding sides of the hub are arranged offset with respect to each other so as to dispose these arms on opposite sides of a transverse line through the center of the hub whereby to dispose their side portions 24 flush with the side walls 25 of the hub. Each arm is provided at the edge adjacent the side portion 24 with a longitudinal groove 26 which constitutes a continuation of a groove 27 formed in the edge adjacent the side wall 25 of the hub. In these grooves there are adapted to be mounted the cutting blades 28, which cutting blades include shank portions 29 adapted for insertion in the grooves. The outer end portion 30 of the blade is tapered upwardly and outwardly from the shank portion 29 so as to dispose this portion upon a beveled surface 31 provided by the arms on the outer sides of the grooves. To complete the mounting of the blades there may be provided a substantially square shaped ring 32 secured to the face of the hub by screws 33 so that the ring will be clamped against adjacent portions of the blades whereby to effectuate removable connection of the blades with the holder. It will be seen that the inner end portion of each blade extends to a position which overlaps the arm adjacent to the arm carrying the blade. The reason for this is to prevent the collection of meat or other ingredients or bony matter from collecting beneath the arms adjacent the hub portion of the holder.

It will be seen that by disposing the blades at the edges nearest the direction of rotation of the blades instead of at the outer edges or the edges farthest away from the direction of rotation of the blades that the blades are disposed parallel with the transverse center line of the hub and at one side thereof and consequently when the hub is rotated the blades will move over the plate in shearing contact with the meat thereby effectively cutting the meat prior to its passage through the openings. By the proper cutting of the meat it will be seen that the possibilities of the meat clogging in the openings of the plate 16 will be reduced to a minimum. Also, the blades with their inner ends extending beyond the transverse center line will move over the holes adjacent the center of the hub and consequently cut such meat as might find movement to this point and will, therefore, force the meat through the openings nearest the center of the plate and thus prevent collection of the meat within this area, which collection of the meat will result in the hardening of the meat and subsequent spoiling by heat created by friction.

I have found by the use of a cutting structure as described herein that the meat is more efficiently ground or cut prior to its passage through the perforations in the plate and consequently the holes in the plate do not become plugged and the blades dull by reason of collection and hardening of meat at such points where the meat otherwise if not properly cut would not pass through such openings or perforations.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In a meat grinder or the like, a rotatable member including a hub and arms extending from the hub with the advancing side edges of the arms in substantial alignment with respect to the sides of the hub whereby said advancing edges of the arms are disposed in advance of a transverse line through the hub, and said arms adjacent said advancing edges being provided with grooves, and cutting elements mounted in said grooves and having cutting edges disposed forwardly of the said advancing edges of the said arms, the inner end of each of said elements being arranged in overlapping relation with the arm of said arms in advance of each element.

2. In a meat grinder or the like, a rotatable member including a hub and arms extending from the hub with the advancing side edges of the arms in substantial alignment with respect to the sides of the hub whereby said advancing edges of the arms are disposed in advance of a transverse line through the hub, and said arms adjacent said advancing edges being provided with grooves, cutting elements mounted in said grooves and having cutting edges disposed forwardly of the said advancing edges of the said arms, the inner end of each of said elements being arranged in overlapping relation with the arm of said arms in advance of each element, and means including a clamping member having portions engaging each of said cutting elements for connecting said cutting elements to said hub.

In testimony whereof I affix my signature.

JOHN A. KLOD.